United States Patent [19]
Cooperman

[11] 4,015,184
[45] Mar. 29, 1977

[54] SILICON JUNCTION DIODE RECTIFIER POWER PACK

[75] Inventor: Seymour A. Cooperman, Chicago, Ill.

[73] Assignee: Clinton Supply Company, Chicago, Ill.

[22] Filed: Nov. 20, 1975

[21] Appl. No.: 633,573

[52] U.S. Cl. .............................................. 321/8 C
[51] Int. Cl.² .................................... H02M 7/06
[58] Field of Search ............ 321/8 C, 46; 317/100, 317/116; 357/81

[56] References Cited
UNITED STATES PATENTS

| | | | |
|---|---|---|---|
| 2,221,576 | 11/1940 | Dawson | 321/8 C |
| 2,819,435 | 1/1958 | Connell | 357/81 |
| 3,054,933 | 9/1962 | Meykar | 357/81 |
| 3,210,619 | 10/1965 | Kupferberg et al. | 357/81 |
| 3,246,213 | 4/1966 | Hannan | 357/81 |
| 3,611,107 | 10/1971 | Ruckel | 321/8 C |

*Primary Examiner*—William H. Beha, Jr.
*Attorney, Agent, or Firm*—Rummler & Snow

[57] ABSTRACT

A forced-air, convection-cooled, stud-mounted, silicon junction diode, full-wave rectifier power pack having improved cooling air circulation and a more effective electrical conductance and transfer of heat, along with lower and more uniform dissipation of the same, resulting in lower diode junction operating temperatures and correspondingly longer, maintenance-free service life.

8 Claims, 5 Drawing Figures

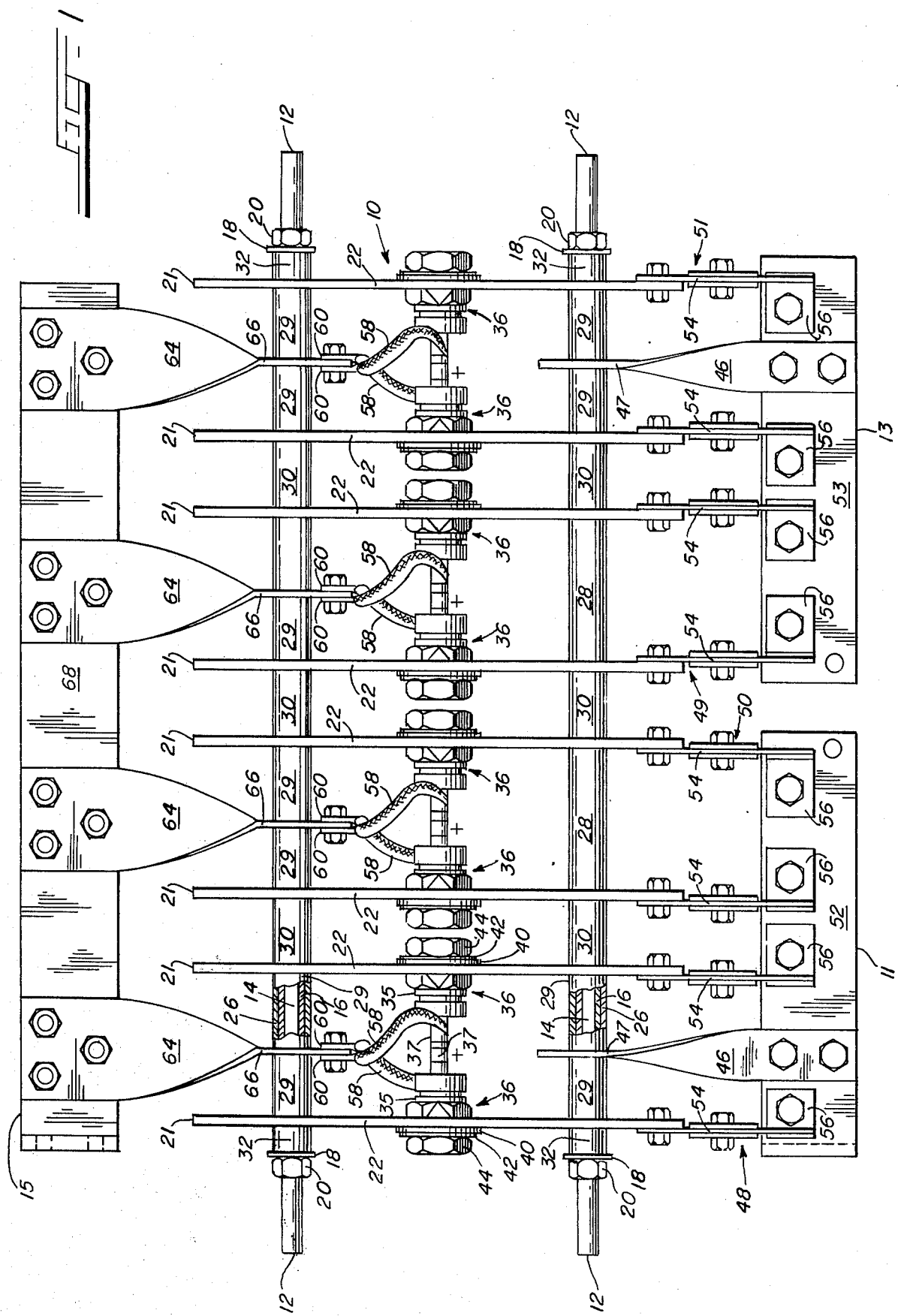

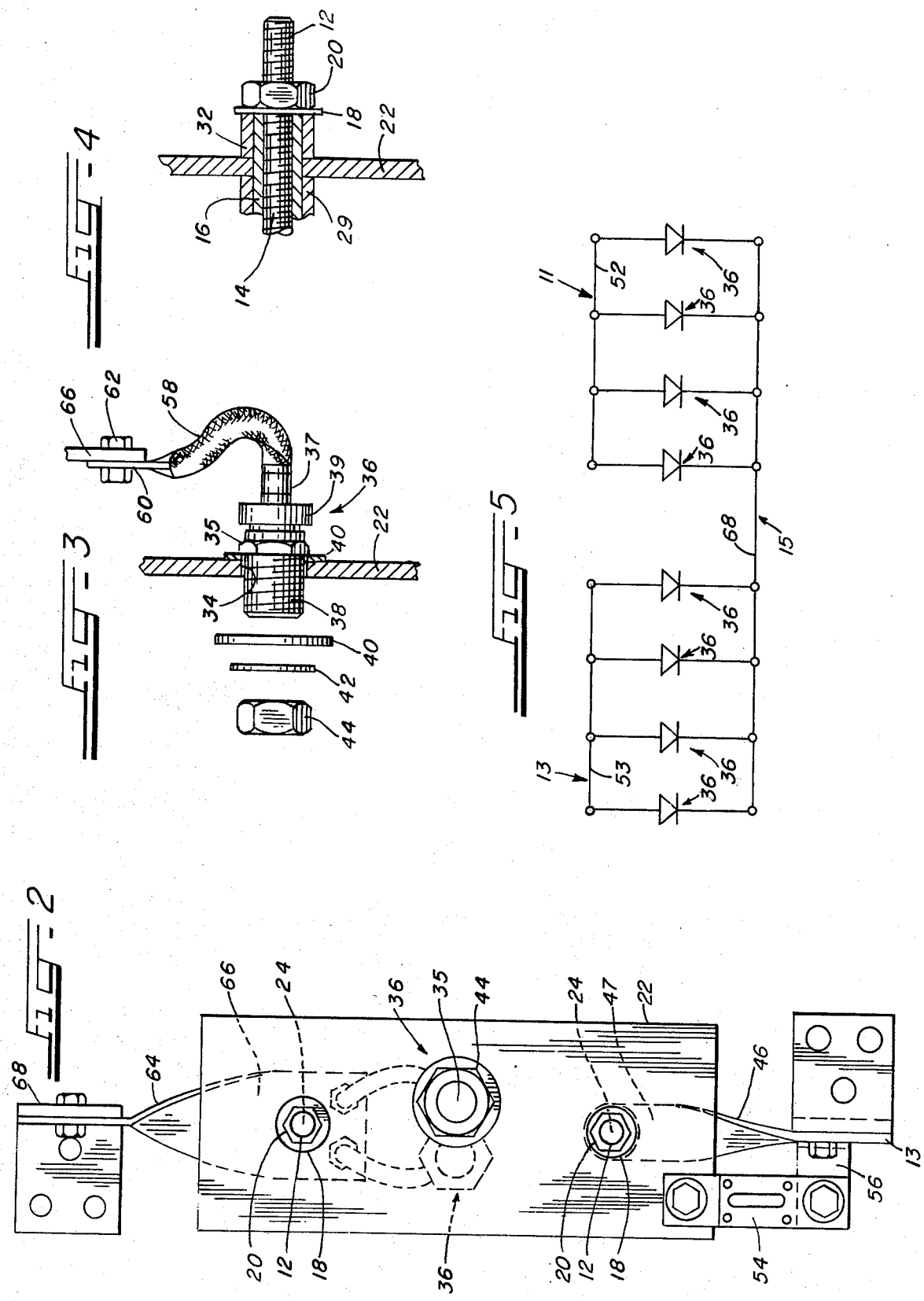

SILICON JUNCTION DIODE RECTIFIER POWER PACK

BACKGROUND OF THE INVENTION

Full-wave silicon junction diode A.C. rectifying power packs are constructed of four basic elements — diodes, electrical conductors for supplying power to and taking power from the diodes, heat sinks for transferring heat from the diodes and structure for supporting the diodes and the electrical conductors thereto. The problem for the designer of such equipment is to incorporate into a design concept the optimum geometric configuration of all these elements that gives the most economic and compact assembly of parts having an acceptable service life without prohibitive burdens of maintenance and repair.

Successful application of diode rectifiers depends to a great extent on adequate cooling. If the junction temperature rises high enough, permanent damage may occur in its characteristics and the device may fail by melting and thermal runaway. Circuits may fail before melting or thermal runaway occurs since insufficient cooling can reduce breakover voltage, and increase diode turn-off time, moving these and other diode characteristics outside specifications sufficiently to induce circuit malfunction. For all these reasons, all diode rectifiers are designed with some type of cooling fin or heat sink to dissipate internal heat losses.

The most common means of cooling stud-mounted diodes is to mount them directly to these cooling fins. Heat losses at the junction of the semiconductor will then flow down through the stud into the fin and then be dissipated to the ambient air by radiation and either free or forced convection heat transfer. The mechanism of heat transfer by forced air convection depends upon local turbulence in the air, thermal conduction down the electrical leads and the mounting for the fin, nearby radiant heat sources, and chimney cooling effects caused by other heated devices above or below the cooling fins. The final measure of the effectiveness of the cooling fin will always be the stud temperature which should never be allowed to exceed the manufacturer's rating for a given load condition.

For silicon junction rectifier diodes having a given heat dissipation rate, there is a lower limit on size for stacked fin assemblies. As fin spacing is reduced, shielding effects become more marked and radiation heat transfer is reduced so the manufacturer's stud temperature limitation may be exceeded.

For fins of thin material, the temperature of the fin decreases as the distance from the heat source or diode increases due to effects of surface cooling. The hottest spot is adjacent to the stud of the diode. The effectiveness depends on the length, thickness and shape of the fin. In general, fin thickness should vary approximately as the square of the fin length in order to maintain constant fin effectiveness. Also, a multi-finned assembly will generally have superior fin effectiveness and will make better use of material and weight than a single flat fin.

The service life of commercially available silicon junction diode rectifying equipment is mostly limited by the exposure of the diode for long periods of time to high operating temperatures from heat generated by the diode itself. The design objective is to dissipate this heat in the most efficient and economic way possible. It is the usual practice for such power converting equipment as silicon junction diode rectifiers to use forced circulation of ambient air for cooling purposes. The most efficient and often the most economical use of forced air convection for cooling of silicon junction diode rectifiers is that imposed on this equipment at minimum pressure drop across the equipment. Electrical circuitry, structural configuration of the heat sinks and structural support configuration are then prime factors affecting the development of pressure drop across the equipment and the distribution of cooling air between the elements therein. It is a present practice of the industry to transfer A.C. negative input currents from the end taps on the secondary winding of the main power transformer to the silicon junction diodes and D.C. positive output current from the diodes to the D.C. output bus bar through an extensive wiring system of multiple cable and lugit connectors. D.C. negative output current from the center tap of the main power transformer to the D.C. negative output bus bar is also handled in like manner. Multiple cables and light connectors increase cooling air pressure drop across the pack for a given cooling requirement.

It is also a present practice of the industry to have heat sinks carry positive D.C. current as well as conduct heat from the heat-generating silicon junction diodes themselves. Heat sinks each serve several silicon diodes and are not insulated from each other so that there is an intertransfer of heat, short circuits and conducting current from one cooling plate to another. D.C. current is also transferred from heat sinks to the main rectifier positive bus bar feeder. The use of heat sinks to conduct D.C. current as well as transfer heat increases the temperature of the heat sinks and the silicon diodes mounted thereon causing the diodes to conduct at considerably higher temperature.

Aluminum for both heat sinks and electrical components of silicon junction diode rectifier power packs has been much used through the industry, again because of cost effectiveness. With aluminum electrical conductors, contact resistance at the terminals generates heat and creates hot spots in the structure especially in the vicinity of the mounting of the silicon junction diode, again contributing to the early breakdown of the same.

There is thus an established need for a silicon junction diode rectifier power pack which gets more cooling benefit out of a forced air convection dollar in a smaller unit for an extended, maintenance-free service life.

SUMMARY OF THE INVENTION

The gist of this invention lies in a combination of material and structural configuration in a forced-air convection stud-mounted silicon junction diode rectifier power pack which makes more efficient use of the cooling air supplied. Silicon junction diodes centrally mount on heat sink fins in a preferred structural configuration and operationally connect in a full wave A.C. rectifying circuit therein.

The heat sink structure of the rectifier of this invention comprises a stack assembly of rectangular 0.1875 × 4 × 10 inch copper fins which are silver plated to insure maximum electrical conductivity and eliminate corrosion. All fins are supported on a mounting throughbolt structure in a mutually parallel relation in the direction of the 10 inch dimension having 3 inch spacing between pairs of fins in a group with 1½ inch spacing between adjacent groups. The fin stack assembly is electrically insulated from the throughbolt structure by fiber tubes concentrically slipped over said throughbolts on which the cooling fins are held in spaced relation to each other by fibrous spacer tubes concentrically slipped thereover inbetween.

The A.C. rectifying circuit comprises an A.C. subassembly having all silicon diode A.C. negative and fuse terminals joined with individual copper bars which are connected to a common copper feeder bar and then transferred by copper bar direct to the main power transformer secondary in which the common copper feeder bar is mounted edgewise to the copper heat sinks for unrestricted cooling air flow therethrough.

Likewise the D.C. circuit comprises a D.C. subassembly having all D.C. positive silicon diode terminals joined with individual copper bar risers to a common D.C. positive copper bar which is connected to the main rectifier positive laminated bus bar copper feeder in which the common D.C. positive copper bar is mounted on the assembly edgewise to the copper heat sinks for unrestricted cooling air flow therethrough.

DESCRIPTION OF THE DRAWINGS

FIG. 1 shows a fragmented plan view of the silicon junction diode rectifier power pack of this invention at approximately one-half scale;

FIG. 2 shows an end view of the same;

FIG. 3 shows a detail view of the mounting of the silicon junction diodes on individual milled center copper heat sink fins;

FIG. 4 shows a detail view of the construction of the heat and electrical insulation between and mechanical support of the heat sink fins; and FIG. 5 shows a symbolic circuit diagram of the same.

DESCRIPTION OF THE PREFERRED EMBODIMENT

Reference to FIG. 1 shows a silicon junction diode rectifier power pack according to the teachings of this invention having an electric circuit, as shown in FIG. 5, wherein main A.C. negative current input sections 11 and 13 and D.C. positive current output section 15 comprise input current bus bars 52 and 53 and output current bar 68, respectively, with eight silicon junction diodes 36 mounted in parallel therebetween. A main frame 10 having dual threaded mounting studs 12 which protrude from each end thereof for anchoring to suitable cabinet mounting brackets (not shown) forms the basic structure for the rectifier power pack. Fore and aft redibolts 14 which are arranged in mutually parallel spaced relation connect at each end to the ends of studs 12 and extend throughout the length of the frame 10 to form the structural backbone thereof. Each main A.C. negative current input section 11 and 13 is subdivided into first and second parallel A.C. negative current input subsections 48 and 50 and third and fourth parallel A.C. negative current input subsections 49 and 51, respectively.

Eight heat sinks 21 constitute the heat dissipative structure of the pack, as shown in FIG. 1. Each heat sink 21 is formed of silver-plated copper fin 22, as shown in FIG. 2. Each fin 22 has dual bores 24 spaced one from the other and drilled through the sides thereof. Said bores 24 are spaced one from the other thereon by an amount equal to the spacing of redibolts 14, as shown in FIG. 4. Bore 24 of each fin 22 slidingly engages the outer diameter of each of the inner fiber tubes 16 on the redibolts 14 which extend lengthwise therethrough in perpendicular relation to the axes thereof and in spaced, paired relation therealong, each pair of fins 22 corresponding to one or the other of the A.C. negative input current subsections 48, 49, 50 or 51.

Eight heat sinks 21 constitute the heat dissipative structure of the pack, as shown in FIG. 1. A silver-plated copper fin 22, as shown in FIG. 2, forms each heat sink 21. Fore and aft bores 24 which are spaced one from the other by the same mutually spaced relation that the redibolts 14 bear to each other are drilled through the side faces of each of the fins 22 in central location thereon. Forebores 24 of each fin 22 assemble of the fore redibolt 14 and aft bores 24 of the same assembly on aft redibolt 14.

An inner cylindrical fibrous tube 16 concentrically slips over the full length of each of the fore and aft redibolts 14 between the threaded studs 12 on each end thereof. Flat washers 18 and hex nuts 20 threadedly engage each of the threaded studs 12 on each end of each redibolt 14 and butt up against the opposed ends of each fiber tube 16 thereon for securing the same on each respective redibolt 14.

A plurality of cylindrical fibrous spacer tube sections 26 concentrically slip over each of the inner fiber tubes 16 comprising two long portions 28 interspaced with twelve intermediate portions 29 and six short portions 30 therebetween which are interspaced between four stub portions 32 on each end thereof all of which slidingly engage the outer diameters of each of the two inner fiber tubes 16 at spaced intervals along the length thereof maintaining the fins 22 in parallel and predetermined spaced relation therealong corresponding to one or the other of the A.C. negative input current subsections 48, 49, 50 or 51. Heat sink fins 22 each slip over each respective inner tube 16, spaced between each long portion 28, each intermediate portion 29 and each short portion 30 of the outer spacer tube sections 26 in proper stacked relation thereon with stub portions 32 on each end thereof to form the first and second A.C. negative current subsections 48, 49, 50 and 51.

A milled center bore 34, as shown in FIG. 2, is located in the flat side of each heat sink fin 22 in central location thereon midway between the spaced bores 24 therein, as shown in FIG. 2. Each of eight matched silicon diodes 36 mounts in the center bore 34 in each heat sink fin 22. Each diode 36 has a rectifying junction 39 mounted on one side of a cathode baseplate 35 with an anode counterelectrode 37 mounted above. Threaded shanks 38 mount to the other side of the baseplate 35 thereon, as shown in FIG. 3, for sliding insertion through the milled center bores 34 in each of the heat sink fins 22. A pressure washer 40, a lock washer 42 and a hex nut 44 assemble in that order on the outstanding end of each shank 38 which has been inserted through each milled center bore 34 for securing each diode 36 to its respective heat sink fin 22.

Two support straps 46 each having a bored end 47, as shown in FIGS. 1 and 2, slidingly engage and are supported by the inner fiber tube 16 in edgewise relation with fins 22 in first and second subsections 48 and 51 of each of the main A.C. negative input current sections 11 and 13, respectively. Two intermediate portions 29 of outer fiber tubes 26 slidingly assemble over inner fiber tube 16 on each side of bored ends 47 of straps 46 between adjacent heat sink fins 22 comprising first and fourth A.C. negative input current subsections 48 and 51, respectively.

A silver-plated copper A.C. negative input current bus bar 52 mounts edgewise to the planes of each of the heat sink fins 22 in the plane of the parallel redibolts 14, as shown in FIG. 1, and electrically connects subsections 48 and 50 in parallel relation in main A.C. negative section 11. Likewise, a silver-plated copper A.C. negative input current bus bar 53 mounts edgewise to the planes of each of the heat sink fins 22 in the plane of parallel redibolts 14, as shown in FIG. 1, and electrically connects subsections 49 and 51 in parallel relation in A.C. negative section 13. Bus bars 52 and 53 are partially supported by the respective ends of each of support straps 46 which are bolted thereto, and otherwise separately supported by diode fuse jumpers 54 which are each bolted at one end to the sides of each of the heat sink fins 22 and at the other end to the top leg of each of the angle clips 56 which have their bottom legs bolted to the top side of each of the bus bars 52 and 53.

Cable leads 58 are each fused at one end to each of the corresponding anodes 37 of the matched silicon diodes 36, as shown in FIG. 3. Lugit connectors 60 attach to each of the other ends of the cable leads 58. Binding screws 62 engage each of the lugit connectors 60.

Quadruple silver-plated copper D.C. output risers 64 arranged in edgewise relation with fins 22 comprise the D.C. positive output current section 15. A bored midsection 66 (not shown) of each output riser 64 slidingly engages and is supported by the inner fiber tube 16. Each riser 64 supports each cable lead 58 corresponding to respective A.C. input current subsections 48, 49, 50 or 51. Each riser 64 secures endwise on fiber tube 16 of the D.C. positive output current section 15 separated by two intermediate portions 29 of outer fiber tube sections 26 which are each slidingly placed over inner fiber tube 16 on each side thereof between successive heat sink fins 22 comprising one or the other of each of the A.C. negative input current subsections 48, 49, 50 or 51.

A silver-plated copper D.C. positive output current bus bar 68 which is also mounted edgewise to the planes of the heat sink fins 22 and in the plane of the parallel redibolts 44 connects A.C. negative input current subsections 48, 49, 50 and 51 in parallel electrical relation in D.C. positive output current section 15, as shown in FIG. 1. Each of the risers 64 support bus bar 68 and are bolted thereto.

Although but one specific embodiment of this invention is herein shown and described, it will be understood that details of the construction shown may be altered or omitted without departing from the spirit of the invention as defined by the following claims.

I claim:

1. In an air-cooled, full-wave silicon junction diode rectifier having long bolts with tubular insulation thereabout arranged in parallel side-by-side relation and a pack of elongated heat sink plates mounted in parallel side-by-side relation thereon over said tubular insulation, the improvement in conductor for transfer of D.C. current from the anode electrodes of the diodes to the main rectifier D.C. positive output busbar lying in the direction of elongation of said heat sink plates and bearing a perpendicular relation thereto comprising:
   a. a cable operationally connected at one end to the anode electrodes of each of said diodes; and
   b. twisted straps for support of said D.C. positive output busbar having bored flat portions at one end for slidingly mounting on said tubular insulation, each strap installed on one of said long bolts at locations corresponding to alternate pairs of heat sink plates, said straps extending from said pack in the direction of elongation of said heat sink plates having cross-sections in said direction lying in planes perpendicular to the planes of said heat sink plates, and operationally connected at said one end to the other end of said cable, and said straps fastened to and supporting and operationally connecting to said D.C. positive output busbar at the other end.

2. In an air-cooled, full-wave silicon junction diode rectifier having long bolts with tubular insulation arranged thereabout in parallel side-by-side relation and a pack of elongated heat sink plates mounted in parallel side-by-side relation thereon over said tubular insulation, the improvement in A.C. negative input busbar lying in the direction of elongation of said heat sink plates and bearing a perpendicular relation thereto comprising a twisted support strap for said A.C. negative input busbar having a bored flat portion at one end for slidingly mounting on said tubular insulation, each strap installed on the other of said long bolts at locations corresponding to the pairs of plates adjacent the ends of said bolts, said straps extending from said pack in the direction of elongation of said heat sink plates having cross-sections in said direction lying in planes perpendicular to the planes of said heat sink plates, and said straps fastened to and supporting said A.C. negative input busbar at the other end.

3. An air-cooled, full-wave silicon junction diode rectifier power pack providing for ease of diode changeability, maximum electrical conductivity and minimum heat generation comprising:
   a. a frame having first and second long bolts extending in parallel side-by-side relation in the direction of the pack;
   b. a plurality of flat heat sink plates each elongated in the direction of the plane of the bolts and mounted on and insulated from said bolts and packed thereon in perpendicular relation thereto, said plates spaced in said pack in parallel side-by-side relation in alternate pairs, each pair having plates spaced one from the next by a working clearance for installation of the anode electrode of said silicon junction diode therebetween, and each pair spaced on each side thereof by a working clearance between it and the next adjacent pair for installation of the threaded retention of the cathode electrode of each of said diodes in the central portion of each of said plates;
   c. flat fuse means operationally connected to each heat sink plate at one end thereof and mounted in the same relative location thereon and extending therefrom in the direction of elongation of said plates having flats thereof in planes parallel to the planes of said plates;
   d. first and second flat A.C. negative input busbars each bearing a perpendicular relation with said heat sink plates and lying in planes parallel to the plane of said long bolts and each operationally connected to one-half of the fuse means and mounted on and insulated from the frame by a twisted support strap having at one end a bored flat portion bearing a parallel relation with said heat sink plates for sliding over tubular insulation installed on the first of said long bolts between said pairs of plates adjacent the ends of said bolts, and at the other end a flat bolted portion extending in a plane having a perpendicular relation with said heat sink plates for attachment to one of said input bars;

e. a flat D.C. positive output busbar having a perpendicular relation with said heat sink plates and lying in a plane parallel to the plane of said long bolts, and mounted on and insulated from the frame by twisted riser straps each strap having at one end a bored flat portion bearing a parallel relation with said heat sink plates for sliding over tubular insulation installed on the second of said long bolts between said alternate pairs of plates and at the other end a bolted flat portion extending in a plane having a perpendicular relation with said heat sink plates for attachment to said output bar; and f. a plurality of cable leads each having electrical connectors operationally connected at one end to said bored flat portion of each of said riser straps and at the other end to each of said anode electrodes of said silicon junction diodes, each diode having its cathode electrodes operationally connected to and mounted on each of said heat sink plates.

4. A silicon junction diode rectifier power pack as set forth in claim 3 wherein the heat sink plates comprise copper material having silver plating.

5. A silicon junction diode rectifier power pack as set forth in claim 3 wherein the fuse means comprises copper material having silver plating and elongated in the direction of the elongation of said heat sink plates.

6. A silicon junction diode rectifier power pack as set forth in claim 3 wherein the A.C. negative input busbar comprises an elongated plate of copper material having silver plating.

7. A silicon junction diode rectifier power pack as set forth in claim 3 wherein the D.C. positive output busbar comprises an elongated plate of copper material having silver plating.

8. A forced-air, convection-cooled, full-wave silicon junction diode rectifier power pack comprising:

a. a supporting structure;

b. a first plurality of heat sink fins of rectangular shape and uniform edgewise thickness mounted on and insulated from said supporting structure in mutually spaced and parallel relation thereon;

c. a first plurality of flat fuse elements each fuse element having one terminal operationally connected to and mounting edgewise on one end of each of the first plurality of heat sink fins;

d. a first A.C. input feeder bar support strap having one end mounted edgewise on and insulated from said supporting structure in edgewise relation to the heat sink fins;

e. a first A.C. input feeder bar operationally connected to the other terminal of each of the first plurality of fuse elements and mounting on the other end of said first support strap in edgewise relation to the heat sink fins;

f. a first plurality of stud-mounted, silicon junction diodes, each diode operationally connected to and centrally mounting on each heat sink fin;

g. a second plurality of heat sink fins of rectangular shape and uniform edgewise thickness mounted on and insulated from said supporting structure in mutually spaced and parallel relation thereon;

h. a second plurality of fuse elements, each fuse element having one terminal operationally connected to and mounting edgewise on one end of each heat sink fin;

i. a second A.C. input feeder bar support strap mounted edgewise on and insulated from said supporting structure in edgewise relation to the heat sink fins;

j. a second A.C. input feeder bar operationally connected to the other terminal of each of the second plurality of fuse elements amd mounting on the other end of said first support strap in edgewise relation to the heat sink fins;

k. a second plurality of stud-mounted, silicon-junction diodes, each diode operationally connected to and centrally mounting on each heat sink fin;

l. a second A.C. input feeder bar operationally connected to the other terminal of each of the second plurality of fuses and mounting on the other end of said second support strap in edgewise relation to the heat sink fins;

m. a plurality of combination D.C. output riser bars operationally connected at one end to the lugit on the end of each cable lead on each stud-mounted, silicon junction diode and D.C. output bus bar support strap mounted edgewise on and insulated from said supporting structure in edgewise relation to the heat sink fins; and n. a D.C. output bus bar operationally connected to the other terminal of each of the second plurality of combination D.C. output riser bars and D.C. output bus bar support straps.

* * * * *